(No Model.)
H. COCHRAN & J. L. HARDIE.
DUST COLLAR FOR VEHICLE AXLES.
No. 473,612. Patented Apr. 26, 1892.
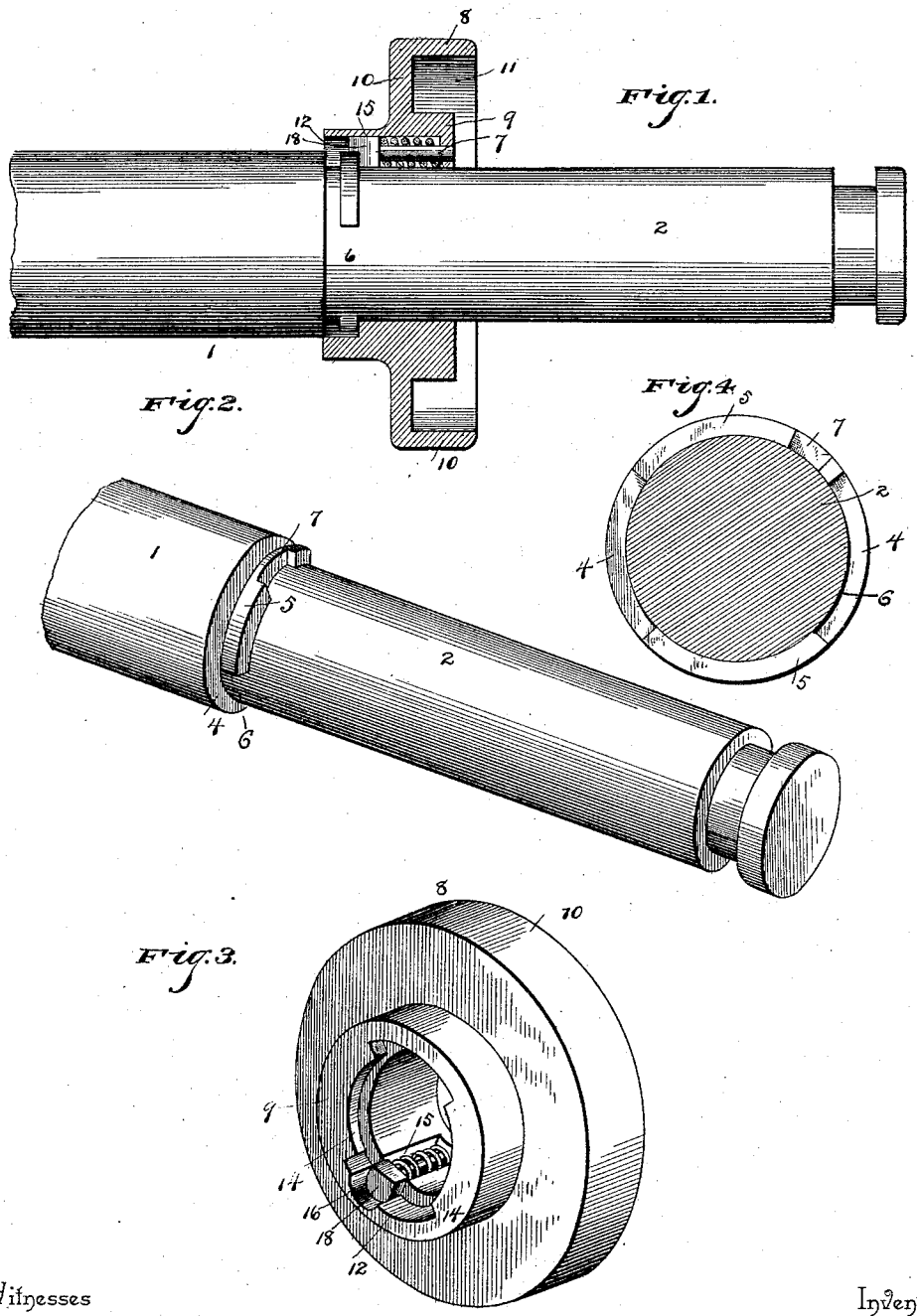
Witnesses
B. S. Ober
W. S. Duvall
By their Attorneys,
C. A. Snow & Co.
Inventors
Henry Cochran
James L. Hardie

UNITED STATES PATENT OFFICE.

HENRY COCHRAN AND JAMES L. HARDIE, OF CHESTER, PENNSYLVANIA.

DUST-COLLAR FOR VEHICLE-AXLES.

SPECIFICATION forming part of Letters Patent No. 473,612, dated April 26, 1892.

Application filed January 21, 1892. Serial No. 418,770. (No model.)

*To all whom it may concern:*

Be it known that we, HENRY COCHRAN and JAMES L. HARDIE, citizens of the United States, residing at Chester, in the county of Delaware and State of Pennsylvania, have invented a new and useful Dust-Collar, of which the following is a specification.

Our invention relates to improvements in dust-collars; and the objects are to provide a dust-collar adapted to be removably and conveniently secured upon an axle, thus permitting of a removal of the wheels and substituting of other wheels, and to so construct the collar as to prevent the admission of dust to the axle-box.

With these objects in view the invention consists in certain features of construction hereinafter specified, and particularly pointed out in the claims.

Referring to the drawings, Figure 1 is an elevation of one end of an axle constructed in accordance with our invention and provided with a dust-collar for coacting therewith, the collar being shown in section. Fig. 2 is a detail in perspective of the end of the axle. Fig. 3 is a detail in perspective of the collar. Fig. 4 is a transverse section of the journal.

Like numerals of reference indicate like parts in all the figures of the drawings.

1 designates an axle, which, toward its end, is provided with a reduced bearing portion 2, a portion of which enters the oil or axle box. By the reduction of the axle to form the bearing portion 2 an annular shoulder 4 is produced. Located upon the reduced portion 2, a short distance from the shoulder 4, are portions or segments of an annular collar or boss 5, between the ends of which spaces 6 exist. One of the segments 5 of the collar is provided upon its outer side with a notch 7. The axle-box is provided upon its inner side with an inwardly-disposed annular flange or collar 8.

The dust-collar forming a part of our invention comprises a cylindrical hub 9, of a width slightly less than the distance between the shoulder 4 of the axle and the oil-box. From this hub extends an annular L-shaped flange 10, the outer perimeter of which projects outwardly beyond the end of the hub and combines with the hub to form an annular space 11, designed to receive the annular flange or collar 8 of the oil-box. The inner edge of the bore of the hub is provided with an annular L-shaped recess 12, of a width equal to the combined width of the segmental boss 5 and the groove 13, formed between the same and the shoulder 4. This recess 12 is provided at its outer edge and at diametrically-opposite sides with internal segmental locking-ribs 14, which occupy half of the space. Near the end of one of these ribs or slightly beyond the same a recess 15 is formed in the wall of the hub and extends from the inner edge of the same to near the outer edge, at which latter point it terminates in a countersunk seat or perforation 16. The cylindrical portion 17 of a bolt is seated in the recess 15 and the perforation 16 and terminates at its upper end in a head 18. Between the head 18 and the bottom of the recess 15 a coiled spring 19 encircles the bolt and supports the same yieldingly in position.

In operation the collar is slid upon the axle and the ribs 14 are passed between the ends of the segmental collar portions or bosses 5, or, in other words, through the spaces 6. The collar is then turned to one side or given a partial rotation, during which the flanges 14 will take into the annular space 13 and the bolt will be forced to ride against the outer edge of the annular segmental boss against the tendency of its spring, which movement will be continued until the notch in the said segmental boss is reached, when the bolt will be forced into engagement with the notch and prevent further lateral movement in either direction of the collar. The flanges and bosses interlocking will prevent longitudinal movement upon the axle, and in this manner the collar becomes locked.

It will be seen from the foregoing description that in order to remove the collar it is simply necessary to insert a pointed instrument or tool into the cavity in which the bolt resides, compressing the bolt against the tension of its spring, whereby its head is disengaged from the notch, and subsequently rotate the collar until the flanges and bosses may be withdrawn from their interlocking position. In this manner the collars may be removed for the substitution of other wheels and for other purposes.

In operation the peripheral flange of the collar, taking over the annular flange of the oil-box and revolving with the axle, throws all dirt, sand, and dust by centrifugal force from the same and prevents its admission to the said oil-box, as will at once be obvious.

Having thus described our invention, what we claim is—

1. The combination, with the axle 1, having the reduced bearing 2, forming the shoulder 4, and the segmental bosses 5, located upon the reduced portion a short distance from the said shoulder, and the oil-box having the annular inner side, of the collar consisting of the hub 9 and L-shaped annular flange 10 for embracing the oil-box, the hub being provided at its inner edge with an L-shaped recess provided with internal segmental collar-sections, and the spring-pressed bolt located in a recess formed in the hub and adapted to engage with a notch formed in one of the boss-sections of the axle, substantially as specified.

2. The combination, with the axle having the reduced portion 2, the diametrically-opposite boss-sections 5, one of which is provided with a recess, and the oil-box having the inner annular portion, of the collar having the hub and L-shaped flange, the latter embracing the oil-box, said hub being provided at its outer edge with an annular recess, segmental flanges located in the outer end of the recess and adapted to pass between the ends of the boss-sections of the axle, the hub being further provided with a longitudinal recess beyond the end of one of its segmental flanges, a bolt mounted in the recess and terminating at its outer end in a head for engaging the recess of the boss, and the coiled spring interposed between the head of the bolt and the bottom of the recess, substantially as specified.

3. The axle-journal 2, having the bosses 5, notched as described, combined with the dust-collar having the spring-pressed bolt adapted to engage the notches, substantially as described.

4. The axle-journal having the bosses 5, notched as described, combined with the dust-collar having internal collar-sections to interlock with the bosses and a spring-pressed bolt located within the collar to engage the notches of the bosses, substantially as described.

In testimony that we claim the foregoing as our own we have hereto affixed our signatures in the presence of two witnesses.

HENRY COCHRAN.
JAMES L. HARDIE.

Witnesses:
WM. J. MCDONOUGH,
J. LENTZ GARRETT.